United States Patent [19]

Hays

[11] Patent Number: 4,927,466

[45] Date of Patent: May 22, 1990

[54] TRANSPARENT, HIGH STRENGTH ORGANIC PIGMENTS AND PROCESS FOR MAKING SAME

[75] Inventor: Byron G. Hays, Verona, N.J.

[73] Assignee: BASF Corp., Parsipppany, N.J.

[21] Appl. No.: 376,618

[22] Filed: Jul. 7, 1989

[51] Int. Cl.⁵ ............................................. C08K 5/00
[52] U.S. Cl. .................................. 106/494; 106/496
[58] Field of Search ............................... 106/494, 496

[56] References Cited

U.S. PATENT DOCUMENTS 3,120,508   2/1964   Braun et al. .......................... 106/402
3,775,148  11/1973   Bradley ................................ 106/496
4,461,647   7/1984   Schofield et al. .................... 106/494

Primary Examiner—A. Lionel Clingman
Assistant Examiner—Willie J. Thompson
Attorney, Agent, or Firm—Rubert B. Hurley; Michael R. Chipaloski

[57] ABSTRACT

High strength, highly transparent azo pigments have mean ultimate particle size of from 0.010 micron to 0.040 micron. These pigments are produced by a process in which the azo compound is reacted with a coupler in the presence of one or more of a specific group of surface active agents.

22 Claims, No Drawings

TRANSPARENT, HIGH STRENGTH ORGANIC PIGMENTS AND PROCESS FOR MAKING SAME

BACKGROUND OF THE INVENTION

The present invention pertains to certain transparent, high strength azo pigments and to a method for making these pigments. The pigments of the present invention are characterized by their small particle size (about 10 nanometers to about 40 nanometers mean ultimate particle diameter). It is the heretofore unachieved small mean particle diameter which produces the advantageous high strength and high transparency which characterize the pigment particles of the present invention. Whereas the product of the present invention is a pigment having high strength and high transparency, the process of the present invention concerns a method for making such pigments. This method involves the reaction of a di azo compound with a coupler in the presence of one or more of a group of specific surface active agents.

Prior art azo pigments lack the small particle size and degree of transparency of the pigment of the present invention. Furthermore, prior art methods for making azo pigments do not teach the method of the present invention in that the method of the present invention contemplates the presence of a relatively large amount of one or more of a specific group of surface active agents during the coupling reaction, so that the pigment particles produced during the reaction are exceptionally small in mean ultimate diameter.

With respect to the present invention, the following listing constitutes the closest art known to the inventor on his filing date:

U.S. Pat. No. 3,120,508; Baumgart, Dieter, et al, *Improved Pigments for Modern Printing Inks*, American Ink Maker, Volume 99, pages 26–42, January, 1989; U.S. Pat. Nos. 4,461,647; 3,775,148; 4,057,463.

Below is a brief discussion of the closest art known to the inventor of the present invention.

U.S. Pat. Nos. 3,120,508 ('508) describes a process for the manufacture of water-insoluble azo-dyestuffs. The '508 patent teaches the use of a cationic surface-active compound during the coupling reaction, the surface-active compound being present in the range of about 1 to about 10 percent on weight of dyestuff. The '508 patent refers to a broad list of surface-active amines and quaternary ammonium compounds, and the '508 patent states that the mean particle size of the resulting pigment particles is $0.147\mu$. Furthermore, the '508 patent states that high tintorial strength and increased temperature stability characterizes the resulting pigments.

In contrast, the product of the present invention is limited to pigment particles having a significantly smaller mean particle diameter than the particles described in the '508 patent. Furthermore, not only does the process of the present invention pertain only to the production of the significantly smaller pigment particles, the process of the present invention requires the use of one or more of a specific and narrower group of surfactants than those listed in the '508 patent. Accordingly, there are major differences between the '508 patent and the subject matter of the present invention.

The Baumgart, et al article (hereinafter Baumgart) describes improved pigments having high color strength, extremely high transparency, low viscosity, outstanding rheological characteristics, full dispersion, high gloss, and relatively small particle size. At least one of the specific pigments mentioned in the Baumgart article is Pigment Yellow 13, a disazo pigment. Although Baumgart describes the characteristics of the pigment product itself, Baumgart in no way describes how this pigment product is produced. Baumgart does state that the pigments are "specially treated" and that the improved pigments contain no resin, but other than this Baumgart nowhere mentions any details of how the pigment product is produced. Note FIG. 5 of Baumgart, in which it is shown that the pigment particles have a mean particle diameter between 0.048 and $0.055\mu$.

The product and process of the present invention differ from Baumgart in several ways. First, the mean particle size of the pigment of the present invention (as well as the process for making the pigment of the present invention) is significantly lower than the mean particle size of the pigments referred to in Baumgart's FIG. 5. Secondly, in contrast to Baumgart, Applicant has disclosed a detailed, specific process for making the very fine pigment particles of the present invention, this process comprising the use of one or more, specific group of surface-active agents, and furthermore requiring that the use of these surface-active agents be to at least a minimum (relatively large) amount. In contrast, Baumgart nowhere describes any method for making the pigment particles he discloses.

In conjunction with the Baumgart article is another article (Ott et al) published in *American Ink Marker* in June of 1989. The Ott et al article, like Baumgart, was written by employees of Hoechst. However, even though the Ott et al article refers to pigmentary particle size which exhibits a high degree of transparency and color strength (see page 42 column 1), the minimum average particle size mentioned in Ott et al is 82 nanometers or $0.082\mu$.

U.S. Pat. Nos. 3,775,148 ('148) describes diarylide pigment compositions having high strength and high transparency properties in comparison with conventional diaryl pigments. The '148 patent teaches the incorporation of a small percentage of acid-substituted diarylide dyestuffs into the diarylide pigments, the '148 patent further refers to the addition of amines to the prepared pigment product (i.e. a post-treatment with amine). The '148 patent lists a variety of amines to be used in the invention, including primary, secondary, and tertiary amines, and more specifically to the following amines: Armeen T, Rosin Amine, Duomeen C, Armeen L-11 and Duomeen L-15, Ethomeen, Ethoduomeen, and others. Furthermore, the '148 patent states that amount of amine to be added in the post-treatment will generally lie between 0.1 and 35 percent calculated on the weight of pigment and dyestuff.

The present invention differs from the '148 patent in that the '148 patent nowhere refers to the size of the pigment particles produced, in contrast to the product and process of the present invention, wherein the size of the pigment particles is between 0.010 and $0.040\mu$. Another major difference between the process of the present invention and the '148 patent is that the process of the present invention is concerned with coupling in the presence of a surfactant whereas the '148 patent describes a post-treatment with a surfactant. Another major difference between the process of the present invention and the '148 patent is that the '148 patent refers to a broad group of amines as being useful in the process, while the process of the present invention pertains to the use of a significantly smaller group of surfactants. In fact, many of the dyestuffs mentioned in the '148 patent produce precipitation of the surfactants used in the process of the present invention.

U.S. Pat. Nos. 4,057,463 and 4,461,647 (the '463 and '467 patents) both described processes in which a colored compound is post-treated with a surfactant in order to improve the dispersion of the colored species. Both of these patents pertain to dyestuffs, not pigments. Furthermore, the group of surfactants mentioned in each of these patents is much broader than the group of surfactants utilized in the process of the present invention. Thus, there are major differences between the '647 and '436 patents and the present invention.

BRIEF SUMMARY OF THE INVENTION

The present invention pertains to both a pigment product and a process for making that product. The pigment product of the present invention is a high strength, substantially transparent pigment which comprises at least one pigment selected from the group consisting of disazo pigments and monoazo pigments, wherein the pigment particles have an ultimate mean particle diameter of between about $0.010\mu$ and about $0.040\mu$. These disazo and monoazo pigments have an average particle size substantially smaller than prior art disazo or monoazo pigment particles. This small average particle size produces the characteristics of exceptionally high pigment color strength, as well as an exceptionally high degree of pigment transparency.

The process of the present invention concerns a method for making a pigment product, the method comprising reacting a compound selected from the group consisting of diazo and tetrazo compounds with a coupler which is a member selected from the group consisting of acetoacetanilide and substituted derivatives thereof, and phenyl methyl pyrazolone and substituted derivatives thereof. This reaction is carried out in the presence of an appropriate surface-active agent selected from the group consisting of:

A. the acidic salt of N-alkyl-N,N',N'-trimethyl-1,3-propanediamine, as well as the triethyl and tripropyl derivatives thereof;
B. the acidic salt of N-alkyl-N,N',N'-tris(2-hydroxypropyl)-1,3-propanediamine, as well as the 2-hydroxyethyl and 2-hydroxybutyl derivatives thereof;
C. a salt of N-alkyl-N,N,N',N',N'-pentamethyl-1,3-propanediamine, as well as the pentaethyl and pentapropyl derivatives thereof;
D. the acidic salt of N-alkyl-N'-(3-aminopropane)-1,3-propanediamine, as well as tetramethyl, tetraethyl, tetrapropyl, tetrakis(2-hydroxyethyl), tetrakis(2-hydroxypropyl), tetrakis(2-hydroxybutyl), derivatives thereof, as well as quaternary salts up to heptamethyl, heptaethyl, and heptapropyl derivatives thereof;
E. the acidic salt of N-alkyl-N-(3-aminopropane)-1,3-propanediamine, as well as the tetramethyl, tetraethyl, tetrapropyl, tetrakis(2-hydroxyethyl), tetrakis(2-hydroxypropyl), tetrakis(2-hydroxybutyl), derivatives, as well as quaternary salts up to heptamethyl, heptaethyl, and heptapropyl derivatives thereof;
F. the acidic salt of N-(N-alkyl-3-aminopropane)-N'-(3-aminopropane)-1,3-propanediamine, as well as the pentamethyl, pentaethyl, pentapropyl, pentakis(2-hydroxyethyl), pentakis(2-hydroxypropyl), pentakis(2-hydroxybutyl) derivatives thereof, as well as quaternary salts up to nonamethyl, nonaethyl, and nonapropyl derivatives thereof;

wherein the alkyl group has from about 12 to about 22 carbon atoms.

The reaction is carried out so that the resulting pigment particles have an ultimate mean particle size of $0.010\mu$ and about $0.040\mu$.

The product and process of the present invention provide the advantages of exceptionally high pigment strength and an exceptionally high degree of pigment transparency. High pigment color strength is advantageous because the resulting pigment product becomes more valuable per unit mass. Likewise, a high degree of pigment transparency is desirable in certain end uses (e.g. particular printing ink end uses). Other advantages supplied by the present invention include ease of dispersion, lack of agglomeration and low viscosity.

DETAILED DESCRIPTION OF THE PREFERRED EMBODIMENTS

In general, the product of the present invention pertains to disazo and monoazo pigments having the heretofore unachieved ultimate mean particle diameter of between about 0.010 micron and about 0.040 micron. As stated above, this small average size of the particulates provides the advantages of high strength and high transparency. More preferably, the product of the present invention further comprises between 30 percent and 150 percent (based on the weight of dry pigment) of a surface active agent selected from the group consisting of:

A. the acidic salt of N-alkyl-N,N',N'-trimethyl-1,3-propanediamine, as well as the triethyl and tripropyl derivatives thereof;
B. the acidic salt of N-alkyl-N,N',N'-tris(2-hydroxypropyl)-1,3-propanediamine, as well as the 2-hydroxyethyl and 2-hydroxybutyl derivatives thereof;
C. a salt of N-alkyl-N,N,N',N',N'-pentamethyl-1,3-propanediamine, as well as the pentaethyl and pentapropyl derivatives thereof;
D. the acidic salt of N-alkyl-N'-(3-aminopropane)-1,3-propanediamine, as well as tetramethyl, tetraethyl, tetrapropyl, tetrakis(2-hydroxyethyl), tetrakis(2-hydroxypropyl), tetrakis(2-hydroxybutyl), derivatives thereof, as well as quaternary salts up to heptamethyl, heptaethyl, and heptapropyl derivatives thereof;
E. the acidic salt of N-alkyl-N-(3-aminopropane)-1,3-propanediamine, as well as the tetramethyl, tetraethyl, tetrapropyl, tetrakis(2-hydroxyethyl), tetrakis(2-hydroxypropyl), tetrakis(2-hydroxybutyl), derivatives, as well as quaternary salts up to heptamethyl, heptaethyl, and heptapropyl derivatives thereof;
F. the acidic salt of N-(N-alkyl-3-aminopropane)-N'-(3-aminopropane)-1,3-propanediamine, as well as the pentamethyl, pentaethyl, pentapropyl, pentakis(2-hydroxyethyl), pentakis(2-hydroxypropyl), pentakis(2-hydroxybutyl) derivatives thereof, as well as quaternary salts up to nonamethyl, nonaethyl, and nonapropyl derivatives thereof;

wherein the alkyl group has from about 12 to about 22 carbon atoms.

Although several hundred anionic, nonionic, cationic, and amphoteric surface active agents have been tested for their effects of striking Colour Index Pigment Yellow 12, only the above group has been found to result in the production of the small pigment particles of the present invention. Of the surfactants listed above, the most preferred is the acidic salt of N-(N-alkyl-3-aminopropane)-N'-(3-aminopropane)-1,3-propanediamine, wherein the alkyl group contains from about 12 to about 22 carbon atoms.

The above-defined surface active agents (i.e. A-F) may be employed either singly or in combination with one another. Since no two of these agents are believed to be incompatible with one another, all combinations and proportions of agents are believed operable in the product and process of the invention.

Although it is believed that the product of the present invention can be made for any disazo or monoazo pigment, it is much preferred that the product of the present invention is a disazo pigment or a monoazo pigment which is produced by reacting a coupler under acidic conditions in order to avoid any precipitation of the surface active agent during the coupling reaction. The majority of the coupling species available permit coupling (i.e. the striking reaction) under acidic conditions. These couplers include acetoacetanilide and substituted derivatives thereof (e.g. methyl-, methoxy-, and chloro-derivatives), and phenyl methyl pyrazolone and substituted derivatives thereof (e.g. methyl-derivatives). Couplers which require coupling under basic conditions are the naphthols (e.g. 2-naphthol) and the hydroxynaphthoic acids (e.g. 2-hydroxy-3-naphthoic acid). This latter group of couplers is less preferred because the acidic salts of the surface active agents precipitate during the coupling process. Although in the product of the present invention the amount of surface active agent (or agents, as more than one surfactant may be present during a single coupling reaction) may be between 30 and 150 percent (based on dry pigment weight), it is preferred that the amount of surface active agent used is between 40 and 110 weight percent and it is most preferred that the amount of surface active agent is between 50 and 100 weight percent. If too little surface active agent is present, the particle size is not reduced enough, but if an excessive quantity of surface active agent is present, the product becomes diluted by the presence of the excess, resulting in an unnecessary dilution of pigment strength, as well as a potential hindrance to acceptable ink and print properties.

As stated above, the product of the present invention is a disazo or monoazo pigment having a mean ultimate particle size between 0.010 micron and 0.040 micron. As used herein, the phrase "ultimate particle size" is intended to refer to the particle size obtained after extensive ultrasonic dispersion-- i.e. the particle size of a substantially deflocculated dispersion. Of course, even an extensively dispersed dispersion will contain a small fraction of agglomerates, but the size range of 0.010 micron to 0.040 micron takes these agglomerates into account in that the range is a range of mean particle size (i.e. average particle size).

Generally, the pigment product of the present invention has a mean ultimate particle size of between 0.010 micron and 0.040 micron. However, it is preferred that the mean ultimate particle size is between 0.020 and 0.035 micron.

Generally, the product of the present invention pertains to disazo and monoazo pigments. However, it is preferred that the product comprises at least one pigment selected from the group consisting of diarylide yellows, Hansa® yellows, and Naphthol Reds. Still more preferably, the product comprises at least one diarylide yellow pigment. Most preferably, the product comprises at least one of the pigments selected from the group of C.I. Pigment Yellow 12 and Pigment Yellow 13.

In general, the method of the present invention pertains to making disazo and/or monoazo pigments wherein the striking reaction is carried out so that the resulting pigment particles have an ultimate mean particle diameter between about 0.010 micron and about 0.040 micron. The method requires that the striking reaction take place in the presence of a surface active agent selected from the group consisting of:

A. the acidic salt of N-alkyl-N,N',N'-trimethyl-1,3-propanediamine, as well as the triethyl and tripropyl derivatives thereof;

B. the acidic salt of N-alkyl-N,N',N'-tris(2-hydroxypropyl)-1,3-propanediamine, as well as the 2-hydroxyethyl and 2-hydroxybutyl derivatives thereof;

C. a salt of N-alkyl-N,N,N',N',N'-pentamethyl-1,3-propanediamine, as well as the pentaethyl and pentapropyl derivatives thereof;

D. the acidic salt of N-alkyl-N'-(3-aminopropane)-1,3-propanediamine, as well as tetramethyl, tetraethyl, tetrapropyl, tetrakis(2-hydroxyethyl), tetrakis(2-hydroxypropyl), tetrakis(2-hydroxybutyl), derivatives thereof, as well as quaternary salts up to heptamethyl, heptaethyl, and heptapropyl derivatives thereof;

E. the acidic salt of N-alkyl-N-(3-aminopropane)-1,3-propanediamine, as well as the tetramethyl, tetraethyl, tetrapropyl, tetrakis(2-hydroxyethyl), tetrakis(2-hydroxypropyl), tetrakis(2-hydroxybutyl), derivatives, as well as quaternary salts up to heptamethyl, heptaethyl, and heptapropyl derivatives thereof;

F. the acidic salt of N-(N-alkyl-3-aminopropane)-N'-(3-aminopropane)-1,3-propanediamine, as well as the pentamethyl, pentaethyl, pentapropyl, pentakis(2-hydroxyethyl), pentakis(2-hydroxypropyl), pentakis(2-hydroxybutyl) derivatives thereof, as well as quaternary salts up to nonamethyl, nonaethyl, and nonapropyl derivatives thereof;

wherein the alkyl group has from about 12 to about 22 carbon atoms.

Of the surfactants listed above, the most preferred is the acidic salt of N-(N-alkyl-3-aminopropane)-N'-(3-aminopropane)-1,3-propanediamine, wherein the alkyl group contains from about 12 to about 22 carbon atoms. In order to carry out the striking reaction so that the result is a pigment product having an ultimate mean particle diameter between about 0.010 micron and 0.040 micron, several considerations must be met. First, the amount of surface active agent present (during striking) must be high enough to ensure that the desired small particle size results. This amount will depend upon the particular pigment (i.e. the chemical species) being produced and by the mean ultimate particle size desired. Second, the reaction conditions must be suitable for striking. In general, the striking reaction conditions which are used conventionally are suitable for the process of the present invention. A typical striking reaction for Pigment Yellow 12 can be carried out as follows:

To about 253 parts (1.0 mole) of 3,3'-dichlorobenzidine, as its dihydrochloride salt, are added about 1770 parts of water, about 380 parts (3.30 moles) of 31.5% hydrochloric acid, about 880 parts of ice to obtain a temperature of about −5° C., and about 140 parts (2.03 moles) of sodium nitrite. The reactants are stirred typically at about −5° C. to about 5° C., preferably about 0° C., for about 45 to about 90 minutes, preferably about 60 minutes, until all 3,3'-dichlorobenzidine tetrazotizes. Excess nitrous acid is destroyed by adding about 3 parts (0.03 mole) of sulfamic acid. This resulting tetrazo solution is then typically added over about 30 to about 90 minutes, preferably about 60 minutes, to a slurry of about 358 parts (2.02 moles) acetoacetanilide, about 380 parts (4.6 moles) sodium acetate, 101 parts (1.35 moles) of 80% acetic acid and about 7300 parts of water, and maintained at a temperature of about 15° C. to about 30° C., preferably about 20° C., until the tetrazo salt is completely coupled out to form the coupling product.

The method of the present invention is especially suited to the production of at least one member of the group consisting of diarylide yellows, Naphthol Reds, and Hansa® Yellows. Alternatively, the method may be used in the production of one or more of the members of the group consisting of monoazo yellows, monoazo oranges, monoazo reds, monoazo browns, disazo yellows, disazo oranges, disazo reds, and disazo blues. It is most preferred that the process of the present invention is carried out in the production of at least one of the pigments selected from the group consisting of Pigment Yellow 12 and Pigment Yellow 13.

In the process of the present invention, the amount of the surface active agent present during striking should be between 30 and 150 percent (based on dry pigment weight). However, it is preferred that the amount of surface active agent used is between 65 and 110 percent, and it is most preferred that the amount of surface active agent is between 80 and 100 percent.

EXAMPLES 1-3

Pigment Yellow 12 was struck by reacting 3,3'-dichlorobenzidine tetrazonium chloride with acetoacetanilide. The striking reaction was carried out in the presence of a relatively large quantity of a surfactant, as provided in Table I. The striking reaction was carried out at 25° C. Once the striking reaction was complete, the resulting pigment slurry was subjected to momentary (approximately a 2 minute) high speed mechanical dispersion in a Kinematic mixer, followed by ultrasonic dispersion for approximately 1 minute. The ultrasonic device employed was a 300 W Cole-Palmer Branson Ultrasonic Cleaner Model B-321. The temperature during the ultrasonic irradiation was approximately 25° C. Table I provides the results of the coupling reaction in terms of the resulting particle size. Examples 1-3 are considered to be preferred embodiments of the present invention. As can be seen in Table I, the mean particle size of the resulting pigment particles was from 23 to 33 nanometers. The mean diameter shown in Table I was measured by diluting the strike slurry 1:400 with distilled water, placing the diluted slurry in a sample cuvette and determining the mean diameter with a Coulter Electronics Submicron Particle Size Analyzer Model N-4. Three values are listed because the mean diameter measurement was performed 3 times on each sample, at intervals of approximately 4 minutes.

Table I lists 3 surfactants present during the striking of the pigment. Duoquad T is N-tallowalkyl-N,N,N',N',N'-pentamethyl-1,3-propanediamine dichloride, manufactured as a 50 percent solution by Armak Chemicals Division of Akzo Chemicals. Duomeen TTM is N-tallowalkyl-N',N'-trimethyl-1,3-propanediamine, manufactured by Armak. Propoduomeen T/13 is N-tallowalkyl-N,N',N'-tris(2-hydroxylpropyl)-1,3-propanediamine, manufactured by Armak.

TABLE I

Mean Diameters of AAA Yellow Slurries: Striking in the Presence of Surfactants at High Surfactant Level

| Example No. | Surfactant Name | Surfactant Level (wt %) | Mean Particle Diameter (nm) |
|---|---|---|---|
| 1 | Duoquad ® T | 85 | 32; 33; 33 |
| 2 | Duomeen ® TTM | 85 | 23; 23; 25 |
| 3 | Propoduomeen ® T/13 | 85 | 28; 29; 29 |

EXAMPLES 4-7

(Comparative)

Pigment Yellow 12 was struck exactly as described in Examples 1-3, except that the amount of surfactant present was reduced. The ultrasonic dispersion step was also the same as described in Examples 1-3. As can be seen in Table II, the mean particle size of the resulting pigment particles was from 44 to 90 nanometers. The mean diameters listed in Table II were measured in the same manner as the measurements described in Example I.

TABLE II

Mean Diameters of AAA Yellow Slurries: Striking in the Presence of Surfactants at a Lower Surfactant Level

| Example No. | Surfactant Name | Surfactant Level (wt %) | Mean Particle Diameter |
|---|---|---|---|
| 4 | Duoquad ® T | 40 | 80; 87; 90 |
| 5 | Duoquad ® T | 55 | 44; 45; 48 |
| 6 | Duomeen ® TTM | 55 | 49; 51; 54 |
| 7 | Propoduomeen ® T/13 | 55 | 66; 67; 73 |

The embodiments of the invention in which an exclusive privilege or property is claimed are defined as follows:

1. A high strength, substantially transparent pigment product, the product comprising at least one pigment selected from the group consisting of disazo pigments and monoazo pigments wherein the pigment particles have a mean ultimate diameter of between about 0.010 micron and about 0.040 micron.

2. A high strength, substantially transparent pigment product comprising at least one pigment selected from the group consisting of disazo pigments and monoazo pigments, wherein the pigment is produced from a coupling reaction in which the coupler is a member selected from the group consisting of acetoacetanilide and substituted derivatives thereof, and phenyl methyl pyrazolone and substituted derivatives thereof, and wherein the pigment particles have a mean ultimate particle diameter of between about 0.010 micron and about 0.040 micron.

3. The pigment product as described in claim 2 wherein the pigment further comprises between 65 percent, on weight of pigment, and 150 percent, on weight of pigment, of a surface active agent selected from the group consisting of:

A. the acidic salt of N-alkyl-N',N'-trimethyl-1,3-propanediamine, as well as the triethyl and tripropyl derivatives thereof;

B. the acidic salt of N-alkyl-N,N',N'-tris(2-hydroxypropyl)-1,3-propanediamine, as well as the 2-hydroxyethyl and 2-hydroxybutyl derivatives thereof;

C. a salt of N-alkyl-N,N,N',N',N'-pentamethyl-1,3-propanediamine, as well as the pentaethyl and pentapropyl derivatives thereof;

D. the acidic salt of N-alkyl-N'-(3-aminopropane)-1,3-propanediamine, as well as tetramethyl, tetraethyl, tetrapropyl, tetrakis(2-hydroxyethyl), tetrakis(2-hydroxypropyl), tetrakis(2-hydroxybutyl), derivatives thereof, as well as quaternary salts up to heptamethyl, heptaethyl, and heptapropyl derivatives thereof;

E. the acidic salt of N-alkyl-N-(3-aminopropane)-1,3-propanediamine, as well as the tetramethyl, tetraethyl, tetrapropyl, tetrakis(2-hydroxyethyl), tetrakis(2-hydroxypropyl), tetrakis(2-hydroxybutyl), derivatives, as well as quaternary salts up to heptamethyl, heptaethyl, and heptapropyl derivatives thereof;

F. the acidic salt of N-(N-alkyl-3-aminopropane)-N'-(3-aminopropane)-1,3-propanediamine, as well as the pentamethyl, pentaethyl, pentapropyl, pentakis(2-hydroxyethyl), pentakis(2-hydroxypropyl), pentakis(2-hydroxybutyl) derivatives thereof, as well as quaternary salts up to nonamethyl, nonaethyl, and nonapropyl derivatives thereof;

wherein the alkyl group has from about 12 to about 22 carbon atoms.

4. The pigment product as described in claim 3 wherein the pigment product comprises at least one pigment selected from the group consisting of diarylide yellows, Hansa® Yellows, and Naphthol Reds.

5. The pigment product as described in claim 3 wherein the pigment particles have a mean ultimate diameter between 0.20 micron and 0.035 micron.

6. The pigment product as described in claim 3 wherein the pigment product comprises between 65 percent and 110 percent, on weight of pigment, of the surface active agent.

7. The pigment product as described in claim 4 wherein the pigment product comprises at least one pigment selected from the group consisting of Pigment Yellow 12 and Pigment Yellow 13.

8. The pigment product as described in claim 6 wherein the pigment product comprises between 80 percent and 100 percent, on weight of pigment, of the surface active agent.

9. The pigment product as described in claim 7 wherein the surface active agent is the acidic salt of N-(N-alkyl-3-aminopropane)-N'-(3-aminopropane)-1,3-propanediamine wherein the alkyl group contains from about 2 to about 22 carbon atoms.

10. The pigment product as described in claim 9 wherein the pigment particles have a mean ultimate diameter between 0.020 micron and 0.035 micron, and the pigment product comprises between 80 percent and 100 percent, on weight of pigment, of the surface active agent.

11. A method of making a pigment selected from the group consisting of disazo pigments and monoazo pigments, wherein the pigment is produced via a coupling reaction, wherein the coupling reaction is carried out in the presence of a surface active agent selected from the group consisting of:

A. the acidic salt of N-alkyl-N,N',N'-trimethyl-1,3-propanediamine, as well as the triethyl and tripropyl derivatives thereof;

B. the acidic salt of N-alkyl-N,N',N'-tris(2-hydroxypropyl)-1,3-propanediamine, as well as the 2-hydroxyethyl and 2-hydroxybutyl derivatives thereof;

C. a salt of N-alkyl-N,N,N',N',N'-pentamethyl-1,3-propanediamine, as well as the pentaethyl and pentapropyl derivatives thereof;

D. the acidic salt of N-alkyl-N'-(3-aminopropane)-1,3-propanediamine, as well as tetramethyl, tetraethyl, tetrapropyl, tetrakis(2-hydroxyethyl), tetrakis(2-hydroxypropyl), tetrakis(2-hydroxybutyl), derivatives thereof, as well as quaternary salts up to heptamethyl, heptaethyl, and heptapropyl derivatives thereof;

E. the acidic salt of N-alkyl-N-(3-aminopropane)-1,3-propanediamine, as well as the tetramethyl, tetraethyl, tetrapropyl, tetrakis(2-hydroxyethyl), tetrakis(2-hydroxypropyl), tetrakis(2-hydroxybutyl), derivatives, as well as quaternary salts up to heptamethyl, heptaethyl, and heptapropyl derivatives thereof;

F. the acidic salt of N-(N-alkyl-3-aminopropane)-N'-(3-aminopropane)-1,3-propanediamine, as well as the pentamethyl, pentaethyl, pentapropyl, pentakis(2-hydroxyethyl), pentakis(2-hydroxypropyl), pentakis(2-hydroxybutyl) derivatives thereof, as well as quaternary salts up to nonamethyl, nonaethyl, and nonapropyl derivatives thereof;

wherein the alkyl group has from about 12 to about 22 carbon atoms, wherein the coupling reaction is carried out so that the resulting pigment particles have an ultimate mean particle diameter between about 0.010 micron and about 0.040 micron.

12. The method as described in claim 11 wherein the coupling reaction is carried out by reacting a compound selected from the group consisting of diazo and tetrazo compounds with a coupler which is a member selected from the group consisting of acetoacetanilide and substituted derivatives thereof and phenyl methyl pyrazolone and substituted derivatives thereof.

13. The method as described in claim 11 wherein the resulting pigment product is a member selected from the group consisting of monoazo yellows, monoazo oranges, monoazo reds, monoazo browns, disazo yellows, disazo oranges, disazo reds, and disazo blues.

14. The method as described in claim 11 wherein the resulting pigment product comprises at least one member selected from the group consisting of diarylide yellows, Hansa® Yellows, and Naphthol Reds.

15. The method as described in claim 11 wherein the surface active agent is present during the coupling reaction in an amount between 65 percent and 150 percent, on weight of resulting pigment product.

16. The method as described in claim 9 wherein the striking reaction is carried out so that the resulting pigment particles have a mean ultimate particle diameter of between 0.020 micron and 0.035 micron.

17. The method as described in claim 14 wherein the resulting pigment product comprises at least one member selected from the group consisting of Pigment Yellow 12 and Pigment Yellow 13.

18. The method as described in claim 15 wherein the surface active agent is present during the coupling reaction in an amount between 65 percent and 110 percent, on weight of resulting pigment product.

19. The method as described in claim 18 wherein the surface active agent is present during the coupling reaction in an amount between 80 percent and 100 percent, on weight of a pigment.

20. The method as described in claim 19 wherein the surface active agent present during the coupling reaction is N-(N-alkyl-3-aminopropane)-N'-(3-aminopropane)-1,3-propanediamine wherein the alkyl group contains from about 12 to about 22 carbon atoms.

21. The method as described in claim 20 wherein the resulting pigment product comprises at least one member selected from the group consisting of Pigment Yellow 12 and Pigment Yellow 13, and wherein the coupling reaction is carried out so that the resulting pigment particles have a mean ultimate particle diameter of between 0.020 micron and 0.035 micron.

22. A method of making a pigment product comprising at least one member selected form the group consisting of Pigment Yellow 12 and Pigment Yellow 13, wherein the pigment is produced via a coupling reaction is carried out in the presence of a surface active agent comprising N-(N-alkyl-3-aminopropane)-N'-(3-aminopropane)-1,3-propanediamine, wherein the alkyl group contains from about 12 to about 22 carbon atoms, and wherein the surface active agent is present during the coupling reaction in an amount between 80 and 100 percent, on weight of pigment, and wherein the coupling reaction is carried out so that the resulting pigment particles have a mean ultimate particle diameter of between 0.020 micron and 0.035 micron.

* * * * *